United States Patent
Hiraguchi

(10) Patent No.: US 7,316,367 B2
(45) Date of Patent: Jan. 8, 2008

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 412 days.

(21) Appl. No.: 11/102,932

(22) Filed: Apr. 8, 2005

(65) Prior Publication Data
US 2005/0236507 A1    Oct. 27, 2005

Related U.S. Application Data

(63) Continuation-in-part of application No. 10/746,554, filed on Dec. 29, 2003, now abandoned.

(30) Foreign Application Priority Data

Feb. 28, 2005 (JP) ............................. 2005-054785

(51) Int. Cl.
*G11B 23/07* (2006.01)
(52) U.S. Cl. .................................. 242/348.2; 360/132
(58) Field of Classification Search ............... 242/348, 242/348.2; 360/132
See application file for complete search history.

(56) References Cited

U.S. PATENT DOCUMENTS

| 4,555,077 | A | | 11/1985 | Platter et al. |
| 4,572,460 | A | | 2/1986 | Hertrich |
| 5,868,333 | A | * | 2/1999 | Nayak .................... 242/338 |
| 6,273,352 | B1 | | 8/2001 | Johnson et al. |
| 6,315,230 | B1 | | 11/2001 | Hansen et al. |

FOREIGN PATENT DOCUMENTS

JP    11-53862 A    2/1999

* cited by examiner

*Primary Examiner*—John Q. Nguyen
(74) *Attorney, Agent, or Firm*—Sughrue Mion Pllc.

(57) ABSTRACT

A recording tape cartridge has a case rotatably accommodating a single reel on which a recording tape is wound, an opening formed in portions of a front surface and a side surface adjacent to a corner portion of the case, and a door opening and closing the opening by rotating. The opening is for pulling-out of a leader member attached to an end portion of the recording tape. The door is structured so as to be able to cover the corner portion of the case including a portion of a top surface and/or a bottom surface when the door closes the opening.

20 Claims, 16 Drawing Sheets

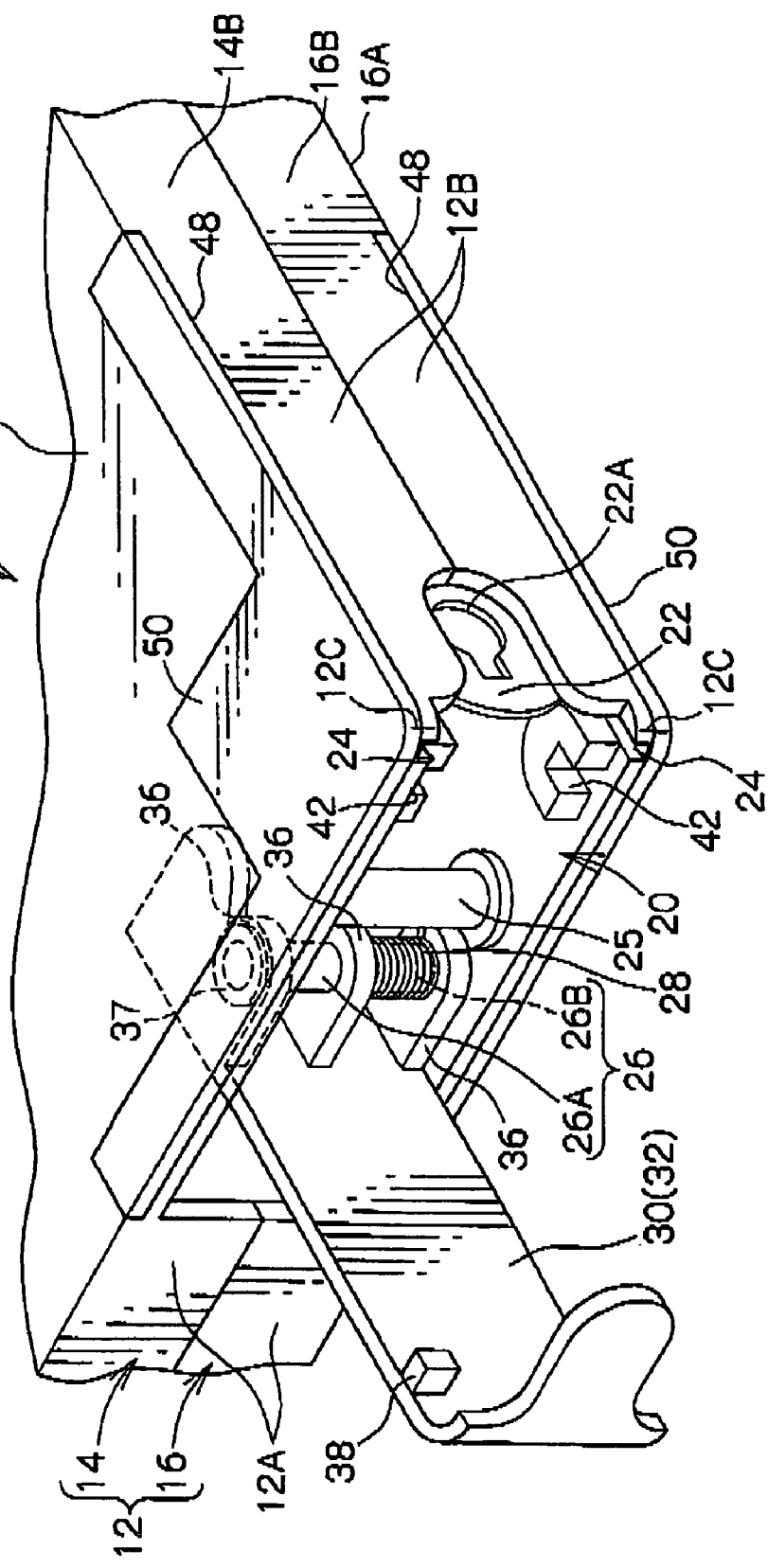

RECORDING TAPE CARTRIDGE

CROSS REFERENCE TO RELATED TO APPLICATION

This is a Continuation-in-Part of application Ser. No. 10/746,554 filed Dec. 29, 2003, now abandoned; the disclosure of which is incorporated herein by reference.

BACKGROUND OF THE INVENTION

1. Field of the Invention

The present invention relates to a recording tape cartridge which accommodates, within a case, a single reel on which is wound a recording tape, such as a magnetic tape or the like, which is used mainly as a recording/playback medium for computers or the like.

2. Description of the Related Art

There have conventionally been known recording tape cartridges in which a recording tape, such as a magnetic tape or the like which is used as a data recording/playback medium for computers or the like, is wound on a single reel, and the reel is accommodated within a case. Such a recording tape cartridge has a substantially rectangular box-shaped case. As shown in FIGS. 16A and 16B for example, a case 102 of a recording tape cartridge 100 is structured by an upper case 104 and a lower case 106, each of which is substantially shaped as a tray, being joined together in a state in which peripheral walls 104A, 106A thereof abut one another. A single reel 108, on which a recording tape T is wound, is rotatably accommodated within the case 102.

A leader member 110, such as a leader tape or the like, is fixed to an end portion of the recording tape T. The leader member 110 is pulled-out by a pull-out member (not illustrated) of a drive device. The pull-out member is usually provided at both side portions of a loading opening into which the recording tape cartridge 100 is loaded. Therefore, an opening 112 formed at the recording tape cartridge 100 is usually formed at a corner portion 102C of the case 102. Even if the opening 112 is not provided at the corner portion 102C, there are cases in which regions which are important to the functioning of the recording tape cartridge 100, such as a supporting shaft 116 of a door 114 which opens and closes the opening 112, or the like, exist in a vicinity of the corner portion 102C.

This corner portion 102C is the place where it is easiest to receive a concentration of stress when an impact is received such as when the recording tape cartridge 100 is dropped or the like. When a concentration of stress is received at the corner portion 102C, local, permanent deformation (crushing, bending, portions breaking off, or the like) occurs at that corner portion 102C, and problems arise in that the recording tape cartridge 100 cannot be loaded into a drive device, the recording tape T cannot be pulled out, the door 114 which opens and closes the opening 112 cannot open and close, or the like.

Further, even if permanent deformation does not occur, the leader member 110 (such as a leader tape or the like) may come out from its held position within the case 102, or get sandwiched between the peripheral wall 104A of the upper case 104 and the peripheral wall 106A of the lower case 106, or fly out of the case 102 if the door 114 opens, due to the occurrence of temporary flexural deformation, i.e., elastic deformation such that the peripheral wall 104A of the upper case 104 and the peripheral wall 106A of the lower case 106 move apart from one another.

Moreover, in order to prevent temporary flexural deformation, it has been thought to weld together or screw together the peripheral wall 104A of the upper case 104 and the peripheral wall 106A of the lower case 106 in a vicinity of the corner portion 102C. However, in such cases, conversely, the path by which the impact force (the energy) received at the time of a drop escapes is eliminated, and permanent deformation is promoted.

SUMMARY OF THE INVENTION

An object of the present invention is to provide a recording tape cartridge in which it is difficult for trouble such as deformation or the like to occur even if impact is applied thereto due to a drop or the like, and which has excellent impact resistance.

In order to achieve the above-described object, the recording tape cartridge relating to the present invention and recited in claim 1 comprises: a case rotatably accommodating a single reel on which a recording tape is wound; and an opening formed in a vicinity of a corner portion of the case, the opening being for pulling-out of a leader member attached to an end portion of the recording tape, wherein a cover member, which covers the corner portion of the case including a portion of a top surface and/or a bottom surface of the case, is provided so as to be rotatable.

In accordance therewith, even if impact is applied due to a drop or the like to the vicinity of the corner portion of the case where the opening is formed, the corner portion, including a portion of the top surface and/or the bottom surface, is covered by the cover member. Therefore, permanent deformation such as breakage or the like does not occur. Further, even if a vicinity of the corner portion attempts to flexurally deform temporarily due to the impact, the cover member covers portions of the top surface and the bottom surface of the case. Therefore, the deformation is suppressed by the cover member. Accordingly, problems, such as the leader member dropping out from the position at which it is held, do not occur.

Further, the recording tape cartridge relating to the present invention and recited in claim 4 comprises: a case rotatably accommodating a single reel on which a recording tape is wound; an opening formed in a vicinity of a corner portion of the case, the opening being for pulling-out of a leader member attached to an end portion of the recording tape; and a door opening and closing the opening, wherein the door is structured so as to be able to cover the corner portion of the case including a portion of a top surface and/or a bottom surface of the case, when the door closes the opening.

In accordance therewith, even if impact is applied due to a drop or the like to the vicinity of the corner portion of the case where the opening is formed, the door which opens and closes the opening covers the corner portion of the case, including a portion of the top surface and/or the bottom surface. Therefore, permanent deformation such as breakage or the like does not occur in a vicinity of the corner portion. Further, even if a vicinity of the corner portion attempts to flexurally deform temporarily due to the impact, the deformation is suppressed by the door because the door covers portions of the top surface and the bottom surface of the case. Accordingly, problems, such as the leader member dropping out from the position at which it is held, do not occur.

Further, the recording tape cartridge relating to the present invention and recited in claim 8 comprises: a case rotatably accommodating a single reel on which a recording tape is wound; an opening formed in portions of a front surface and a side surface adjacent to a corner portion of the case, the opening being for pulling-out of a leader member attached to an end portion of the recording tape; and a door opening and closing the opening by rotating, wherein the door is structured so as to be able to cover the corner portion of the case including a portion of a top surface and/or a bottom surface of the case, when the door closes the opening.

In accordance therewith, even if impact is applied due to a drop or the like to the corner portion of the case, the door, which opens and closes the opening which is formed in portions of the front surface and the side surface adjacent to the corner portion, covers the corner portion of the case, including a portion of the top surface and/or the bottom surface. Therefore, permanent deformation such as breakage or the like does not occur in a vicinity of the corner portion. Further, even if the corner portion attempts to flexurally deform temporarily due to the impact, the deformation is suppressed by the door because the door covers portions of the top surface and the bottom surface of the case. Accordingly, problems, such as the leader member dropping out from the position at which it is held, do not occur.

BRIEF DESCRIPTION OF THE DRAWINGS

FIG. 8 is a schematic perspective view of the corner portion.

DETAILED DESCRIPTION OF THE INVENTION

Embodiments of the present invention will be described in detail on the basis of the drawings. Note that, for convenience of explanation, the direction of loading the recording tape cartridge into a drive device is denoted by arrow A, and this direction is the front direction. Further, arrow B denotes the leftward direction. Front/back, left/right, and top/bottom are expressed by using these directions as references.

Figure 1:
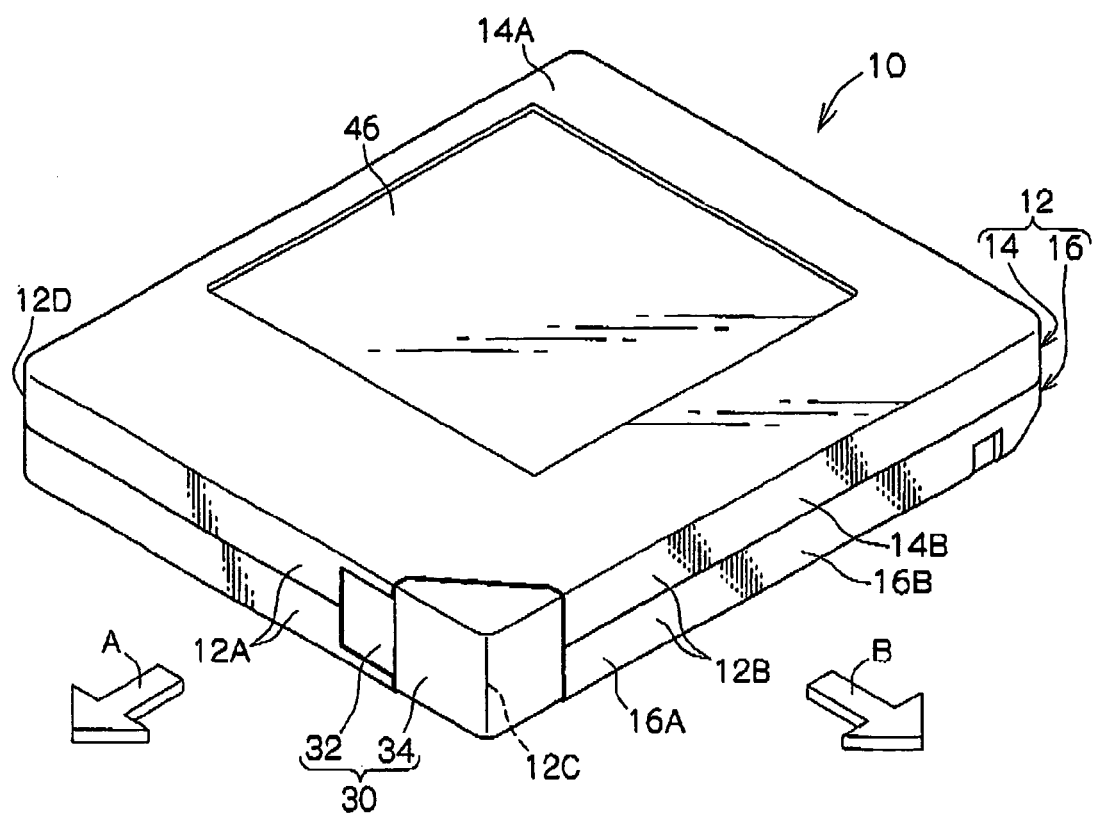
FIG. 1 is a schematic perspective view at a time when an opening of a recording tape cartridge is closed.

As shown in FIG. 1, a recording tape cartridge 10 has a substantially rectangular box-shaped case 12. The case 12 is structured by an upper case 14 and a lower case 16, which are formed of synthetic resin, being joined together by ultrasonic welding or screws or the like in a state in which peripheral walls 14B, 16B thereof abut one another. A label area 46 is formed at a top surface 14A of the upper case 14.

Figure 2:
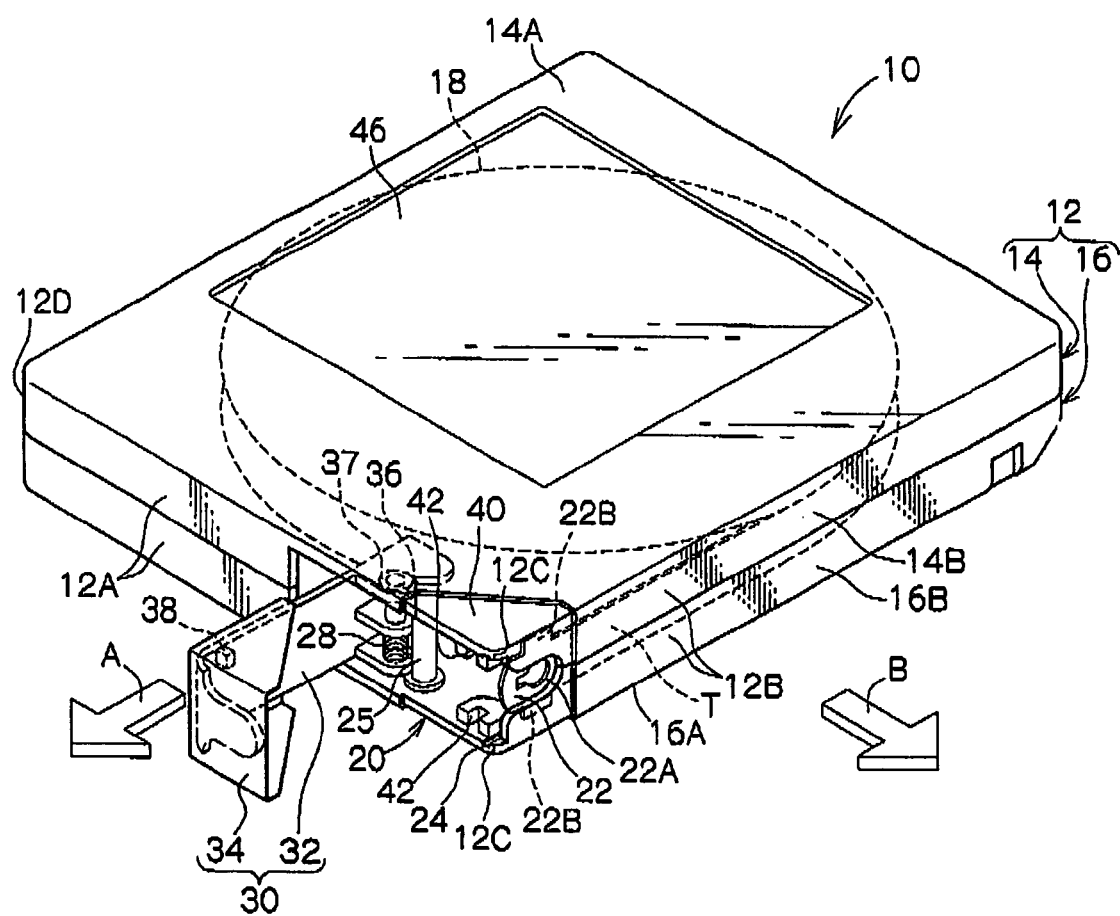
FIG. 2 is a schematic perspective view at a time when the opening of the recording tape cartridge is open.

As shown in FIG. 2, a single reel 18 is rotatably accommodated within the case 12. A recording tape T, which is a magnetic tape or the like and which serves as an information recording/playback medium, is wound around the reel 18. A reel gear 19 is formed in an annular form in the bottom surface of the reel 18, and is exposed from a gear opening 44 formed in the lower case 16 (refer to FIGS. 10B, 11B, and 12B).

Figure 3:
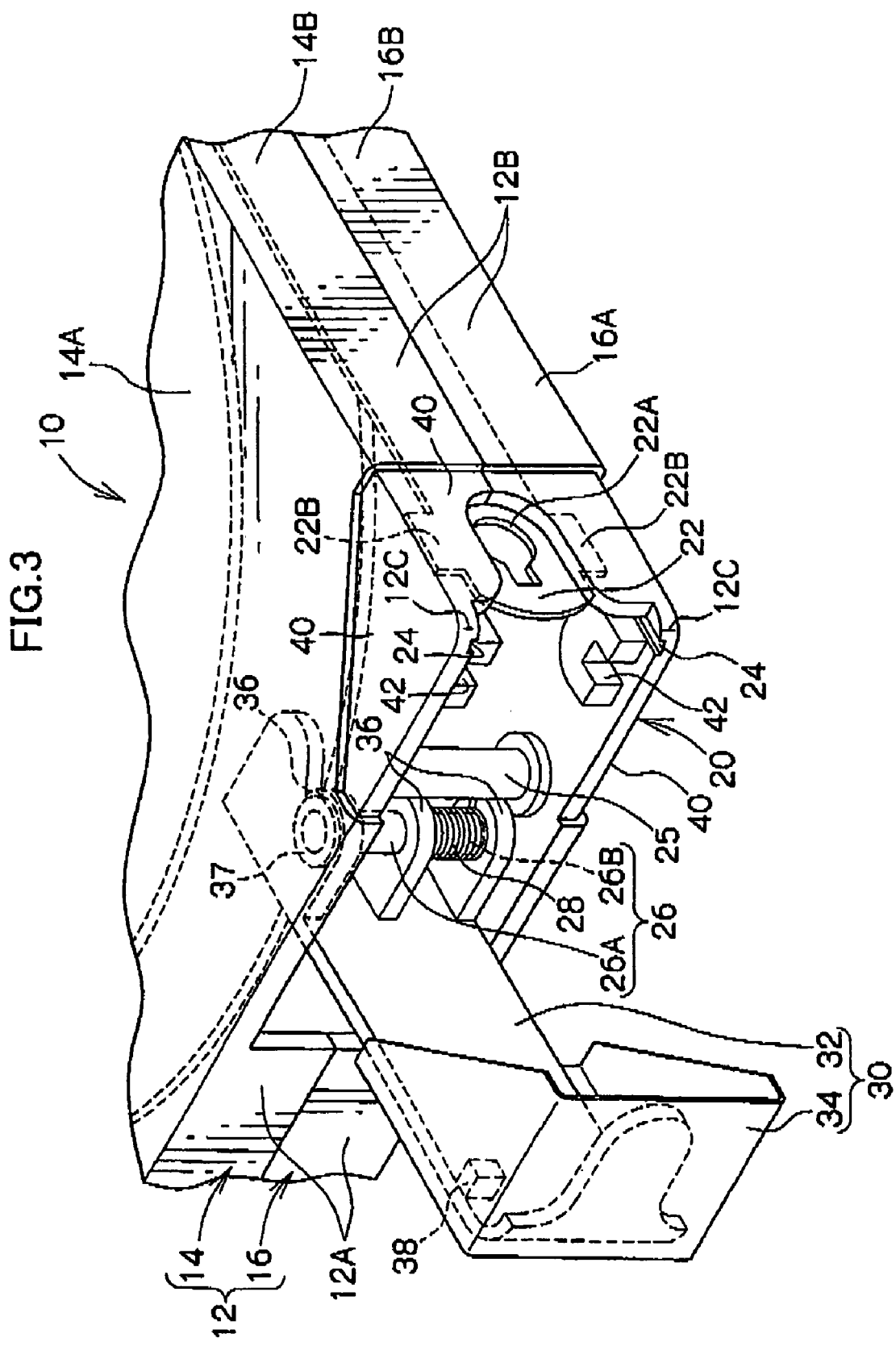
FIG. 3 is a schematic perspective view of a corner portion of the recording tape cartridge.

An opening 20, which is for pulling out to the exterior the recording tape T wound on the reel 18, is formed in a vicinity of a front left corner portion 12C of the recording tape cartridge 10. Namely, as shown in FIG. 3, the opening 20 is formed so as to extend over portions of a front surface 12A and a left side surface 12B which are adjacent to the corner portion 12C. A leader tape 22, which is fixed to an end portion of the recording tape T, is pulled-out from the opening 20.

Here, the corner portion in the present invention means the ridge line portion where the peripheral walls 14B, 16B of the substantially rectangular box-shaped case 12 intersect one another at a substantially right angle or an obtuse angle in plan view. Accordingly, the corner portion 12C in this case means the ridge line portion where the front surface 12A and the left side surface 12B intersect one another at a substantially right angle as seen in plan view.

Further, the vicinity of the corner portion 12C where the opening 20 is formed means the corner portion 12C, and portions of the front surface 12A and/or the left side surface 12B adjacent to or in the neighborhood of the corner portion 12C, or a portion of at least one of the top surface 14A and the bottom surface 16A and portions of the front surface 12A and/or the left side surface 12B adjacent to or in the neighborhood of the corner portion 12C. Note that the opening 20 may be provided in a vicinity of a front right corner portion 12D.

The leader tape 22 is a member-to-be-pulled-out which a pull-out member (not illustrated) of a drive devices engages with in order to pull the recording tape T out. An engagement hole 22A, with which the pull-out member engages, is formed in the distal end of the leader tape 22. As shown in FIGS. 2 and 3, jutting-out portions 22B, which jut out upwardly and downwardly, are formed in a vicinity of the distal end of the leader tape 22. The leader tape 22 is held within the case 12 due to the jutting-out portions 22B being anchored at engagement grooves 24 formed in the inner surfaces of the upper case 14 and the lower case 16 near the left side surface 12B.

When the recording tape cartridge 10 is not in use, the opening 20 is closed by a door 30. The door 30 is formed by a closing member 32 and a cover member 34. The closing member 32 is formed in a substantial L shape as seen in plan view, so as to be the same configuration and size as the opening 20 (see FIGS. 4A and 4B). The cover member 34 is connected integrally to the closing member 32, and covers, from the outside, the corner portion 12C, and portions of the front surface 12A, the left side surface 12B, the top surface 14A, and the bottom surface 16A of the case 12 which are adjacent to or in the neighborhood of the corner portion 12C.

In this way, when the cover member 34 covers the corner portion 12C including portions of the top surface 14A and the bottom surface 16A, even if the impact of a drop is received, permanent deformation such as breakage or the like at this place is prevented. Further, the cover member 34 covers a region including the corner portion 12C while nipping portions of the top surface 14A and the bottom surface 16A of the case 12. Therefore, even if impact of a drop is received, it is possible to suppress temporary flexural deformation at this place, i.e., flexural deformation in which the peripheral wall 14B of the upper case 14 and the peripheral wall 16B of the lower case 16 move apart from one another. Namely, the cover member 34 is not a structure for closing the opening 20, but rather, is a structure for reinforcing the corner portion 12C.

Note that the closing member 32 and the cover member 34 may respectively be molded of resin, or may be formed by a metal such as SUS or the like. In the case in which the closing member 32 and the cover member 34 are formed of metal, they may be formed by pressing (including deep drawing), die casting, or the like, and the thickness thereof is preferably 0.3 to 0.5 mm. Further, either one of the closing member 32 and the cover member 34 may be formed of resin and the other formed of metal. In the case in which one is formed of resin and the other of metal, they may be joined together by adhesion, caulking, fitting, insert molding, outsert molding, or any method of joining.

As shown in FIG. 3, a supporting shaft 26, which is the fulcrum of rotation of the door 30, projects at the upper case 14 and the lower case 16. The portion of the supporting shaft 26 at the upper case 14 side is a tubular boss 26A, whereas the portion at the lower case 16 side is a solid cylindrical boss 26B. The supporting shaft 26 is structured by the distal end (upper end) of the boss 26B at the lower case 16 side being fit into the boss 26A at the upper case 14 side. Accordingly, the diameter of the boss 26B is slightly smaller than the diameter of the boss 26A.

Figure 6A:
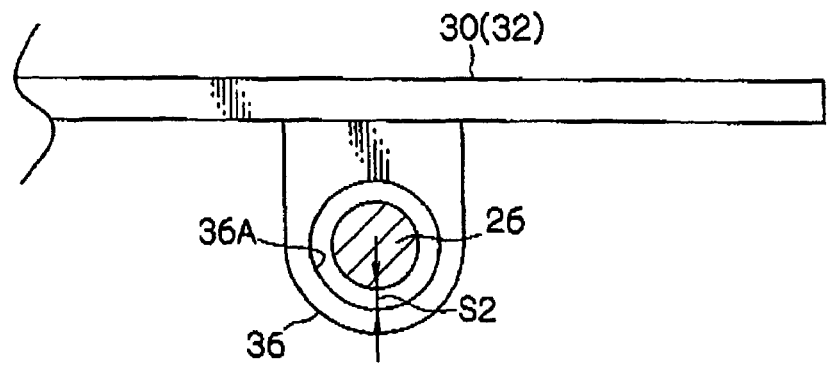
FIG. 6A is a schematic plan view of a supporting shaft and a rotating/sliding portion.
Figure 6B:
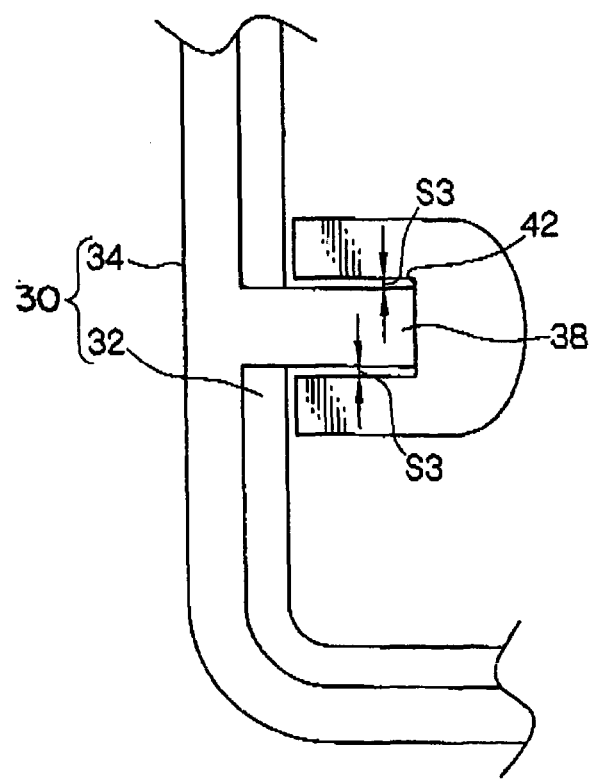
FIG. 6B is a schematic plan view of an abutting portion and an engaging concave portion.

Rotating/sliding portions 36, which are fit with play at the supporting shaft 26, are provided in a vicinity of the right end portion of the closing member 32 of the door 30. The rotating/sliding portions 36 extend from the inner surface of the closing portion 32 at both of the top and bottom end portions and at the intermediate portion thereof. A through hole 36A is formed in each of the rotating/sliding portions 36 (see FIG. 6B). Accordingly, the door is rotatably supported due to the supporting shaft 26 being inserted through the through holes 36A.

Further, an annular convex portion 37 is formed around the through holes 36A at the top surface of the rotating/sliding portion 36 at the top end portion and at the bottom surface of the rotating/sliding portion 36 at the bottom end portion. Due to the annular convex portions 37 contacting the upper case 14 and the lower case 16, gaps of about 0.3 mm to 0.5 mm each are formed between the top edge of the closing member 32 and the upper case 14, and between the bottom edge of the closing member 32 and the lower case 16.

In accordance with such a structure, the upper case 14 and the lower case 16 contact only the annular convex portions 37, and the upper and lower edges of the closing member 32 are always in a state of not contacting the upper case 14 and the lower case 16. Therefore, the sliding resistance of the door 30 (the closing member 32) with respect to the upper case 14 and the lower case 16 is reduced. Note that, if the closing member 32 and the cover member 34 are formed of resin and metal, it is preferable that at least the rotating/sliding portions 36 and the annular convex portions 37 are formed of an olefin resin such as POM or the like. In accordance therewith, the sliding resistance of the door 30 (the closing member 32) with respect to the upper case 14 and the lower case 16 can be reduced even more, and the sliding resistance with respect to the supporting shaft 26 also can be reduced.

Figure 4A:
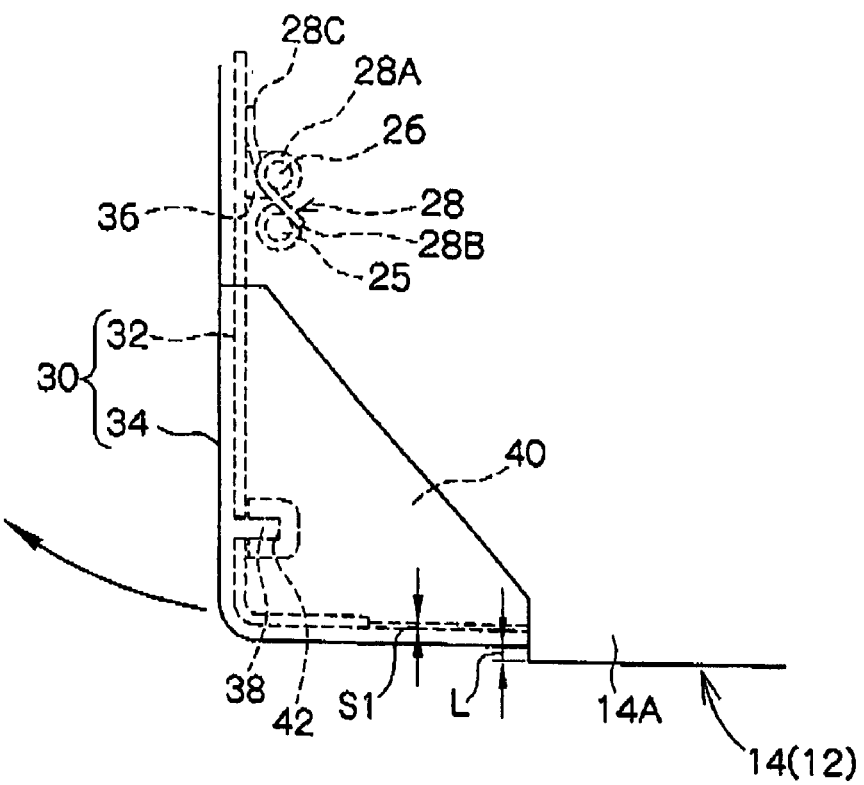
FIG. 4A is a schematic plan view of the corner portion at the time when the opening is closed.
Figure 4B:
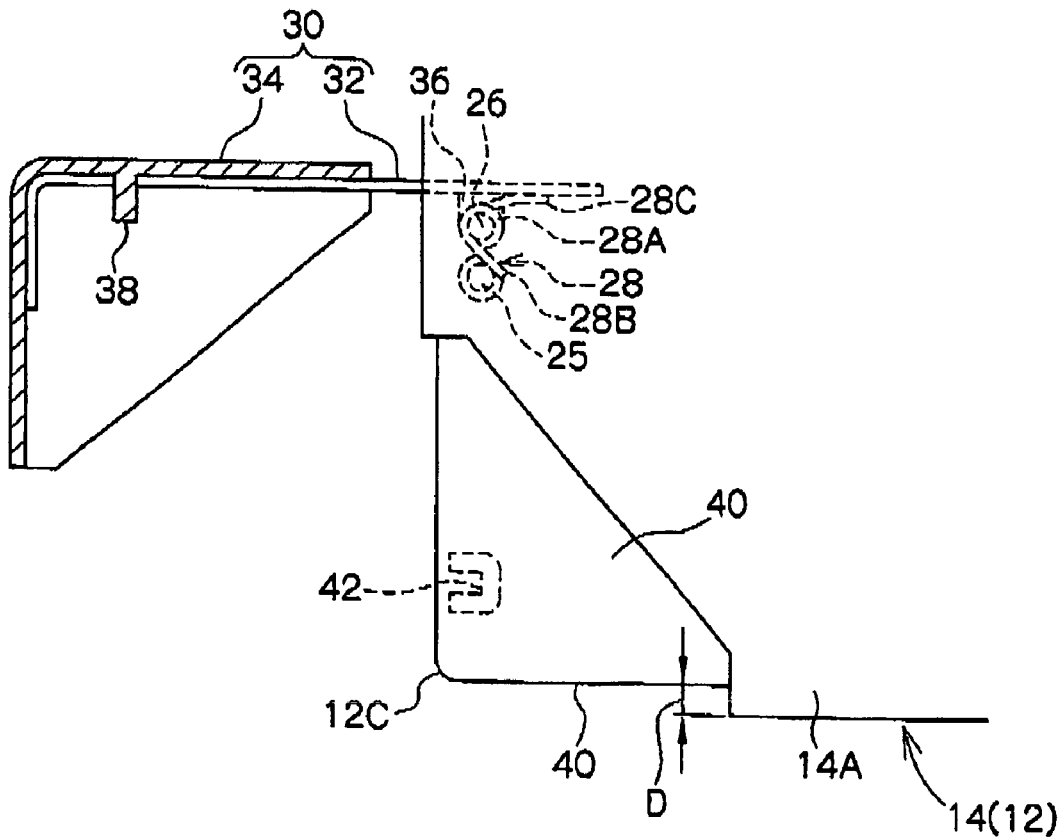
FIG. 4B is a schematic plan view of the corner portion at the time when the opening is open.
Figure 5A:
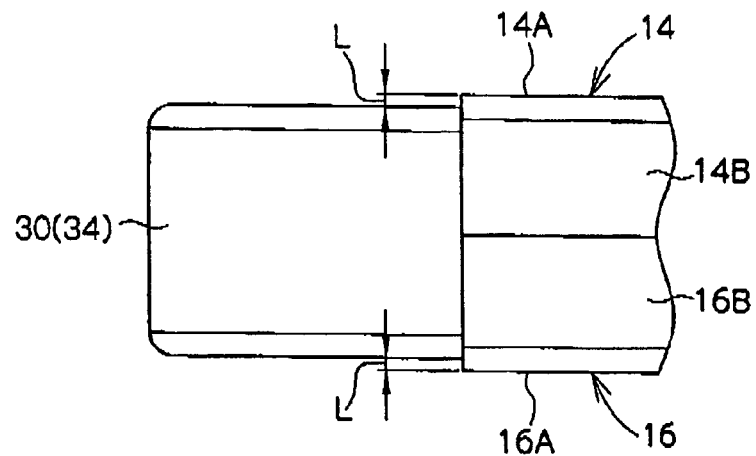
FIG. 5A is a schematic side view of the corner portion at the time when the opening is closed.
Figure 5B:
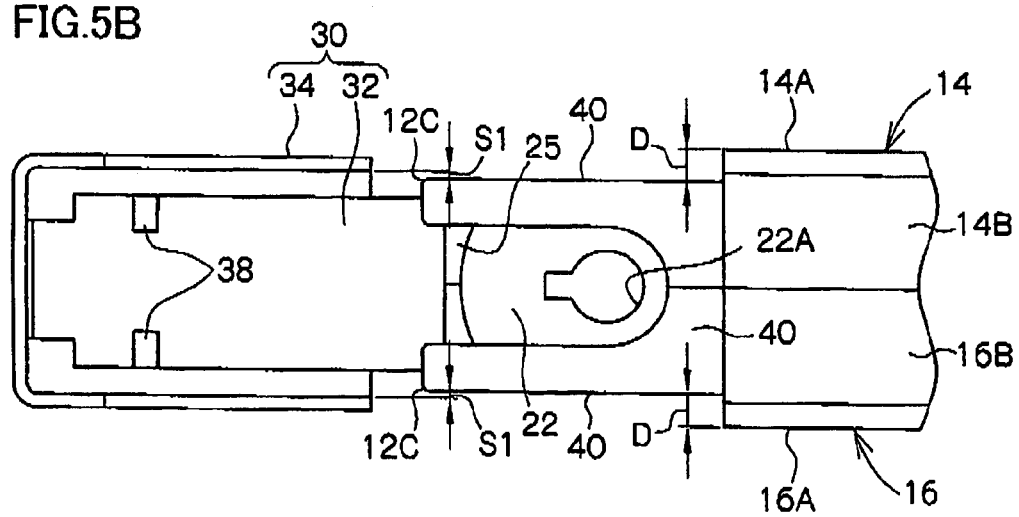
FIG. 5B is a schematic side view of the corner portion at the time when the opening is open.

Moreover, as shown in FIGS. 4A, 4B and 5B, the supporting shaft 26 is inserted through a wound portion 28A of a torsion spring 28, which always urges the door 30 in the direction of closing the opening 20. Namely, the boss 26B, which is the boss having the smaller diameter, is inserted through the wound portion 28A of the torsion spring 28 in a state in which the wound portion 28A is held between the rotating/sliding portion 36 at the bottom end portion and the rotating/sliding portion 36 at the intermediate portion. One end portion 28B of the torsion spring 28 is anchored on a screw boss 25 of the case 12 (in this case, a screw boss projecting from the lower case 16), whereas another end portion 28C is anchored on the inner surface of the closing member 32 at the right rear end portion thereof.

In this way, when the screw boss 25 is provided independently of the supporting shaft 26 and is disposed in a vicinity of the supporting shaft 26, the impact force at the time of a drop is received at the screw boss 25. Therefore, it is difficult for the impact force to be transmitted to the supporting shaft 26. Accordingly, deformation, breakage, and the like of the supporting shaft 26 is prevented. Moreover, when the wound portion 28A of the torsion spring 28 is disposed between the rotating/sliding portions 36, in a case in which the rotating/sliding portions 36 are formed of an olefin resin such as the aforementioned POM or the like, it is more difficult for the supporting shaft 26 to be scratched than in a case in which the case 12 is formed of a resin such as PC or the like. Namely, even if the wound portion 28A of the torsion spring 28 slides due to rotation of the door 30, it is difficult for powder due to abrasion or the like to be generated. Accordingly, the magnetic tape T is not adversely affected.

In any case, in accordance with the above structure, when the door 30 is opened, an opening/closing member (not illustrated) of the drive device enters in relatively from the front surface 12A side and pushes the right end portion of the closing member 32 rearward. Then, as shown in FIGS. 4A and 4B, the door 30 rotates clockwise in plan view around the supporting shaft 26 against the urging force of the torsion spring 28, and opens the opening 20.

Further, as shown in FIGS. 2 through 5B, concave surface portions 40 which match the configuration of the cover member 34 are formed in a vicinity of the corner portion 12C of the case 12, i.e., in the top surface 14A, the bottom surface 16A, the front surface 12A and the left side surface 12B. A depth D of the concave surface portion 40 is formed such that the cover member 34 is L=0.05 mm or more lower than at least the top surface 14A, the bottom surface 16A and the left side surface 12B when the door 30 closes the opening 20. With such a structure, when the recording tape cartridge 10 is loaded into a drive device, problems such as the cover member 34 catching on the loading opening do not occur.

A pair of abutting portions 38 project at the top end and the bottom end of the inner surface of the cover member 34 which inner surface faces the front surface 12A when the opening 20 is closed. When the opening 20 is closed, the abutting portions 38 abut engaging concave portions 42 which project at the inner surface of the case 12 adjacent to the engaging grooves 24.

As shown in FIGS. 4A, 5B, 6A, and 6B, the relationship between a clearance S1 between the cover member 34 and the concave surface portion 40, i.e., between, on the one hand, the cover member 34, and, on the other hand, the top surface 14A, the bottom surface 14A and the left side surface 12B of the case 12, and a clearance S2 between the supporting shaft 26 and the through hole 36A, and a clearance S3 between the abutting portion 38 and the engaging concave portion 42, is S1, S2>S3.

Accordingly, if an impact is applied to the cover member 34 which covers the vicinity of the corner portion 12C due to a drop or the like, first, the impact force is received to a certain extent due to the abutting portions 38 strongly abutting the engaging concave portions 42. Therefore, the impact force applied between the cover member 34 and the concave surface portions 40, and between the supporting shaft 26 and the through holes 36A, can be lessened, and breakage, deformation, and the like of these portions can be prevented.

Figure 7A:
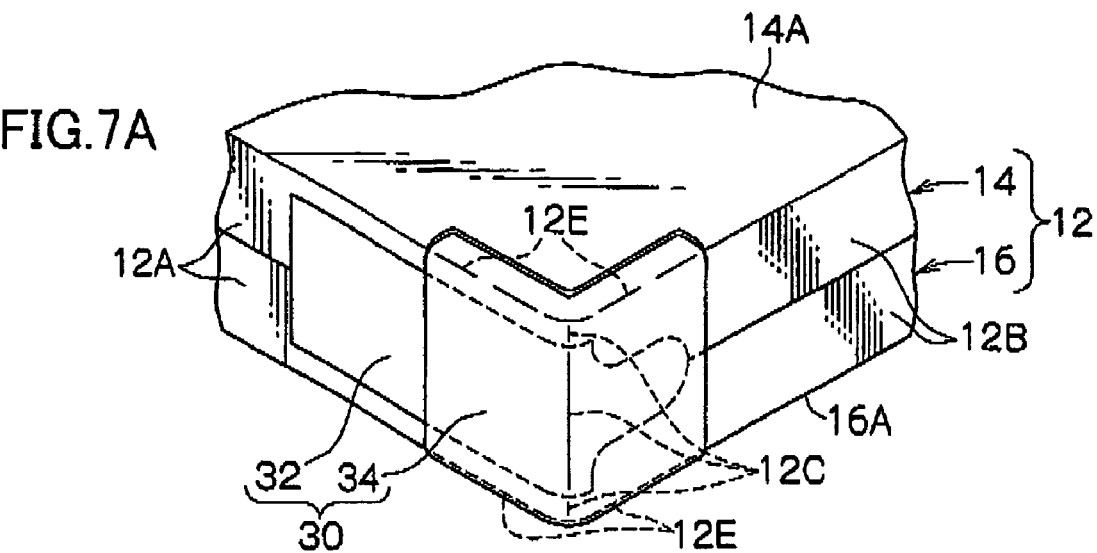
FIGS. 7A through 7C are schematic perspective views showing modified examples of a cover member.

Further, the cover member 34 shown in FIGS. 1 through 5B widely covers portions of the front surface 12A, the left side surface 12B, the top surface 14A and the bottom surface 16A of the case 12, including the corner portion 12C. However, the cover member 34 is not limited to the illustrated structure. For example, as shown in FIG. 7A, the cover member 34 may be formed to a size such that it can cover at least the corner portion 12C and edges (ridge line portions) 12E which are the boundary portions of the top surface 14A and the bottom surface 16A with the front surface 12A and the left side surface 12B.

Figure 7B:
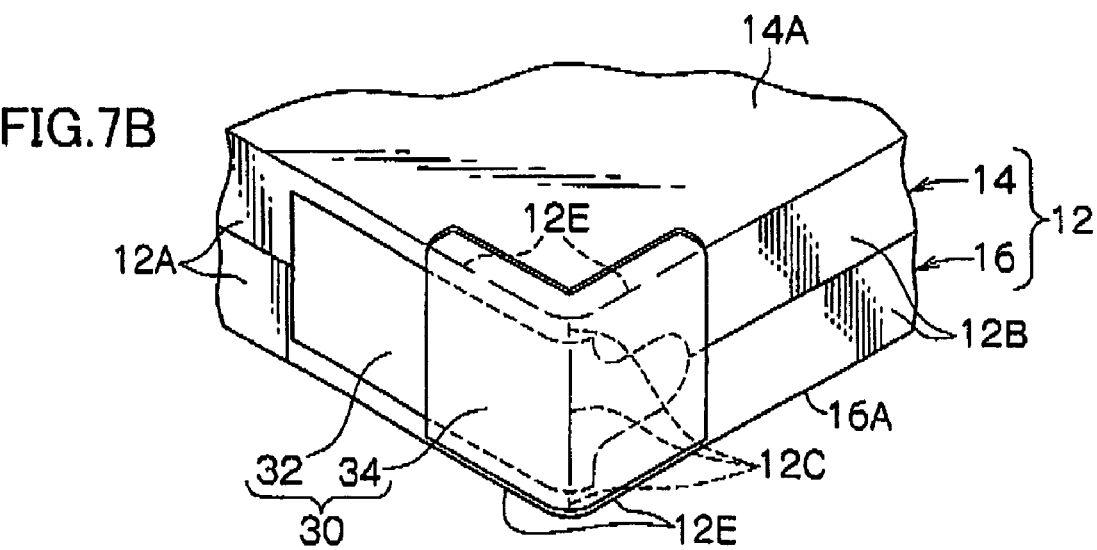
Figure 7C:
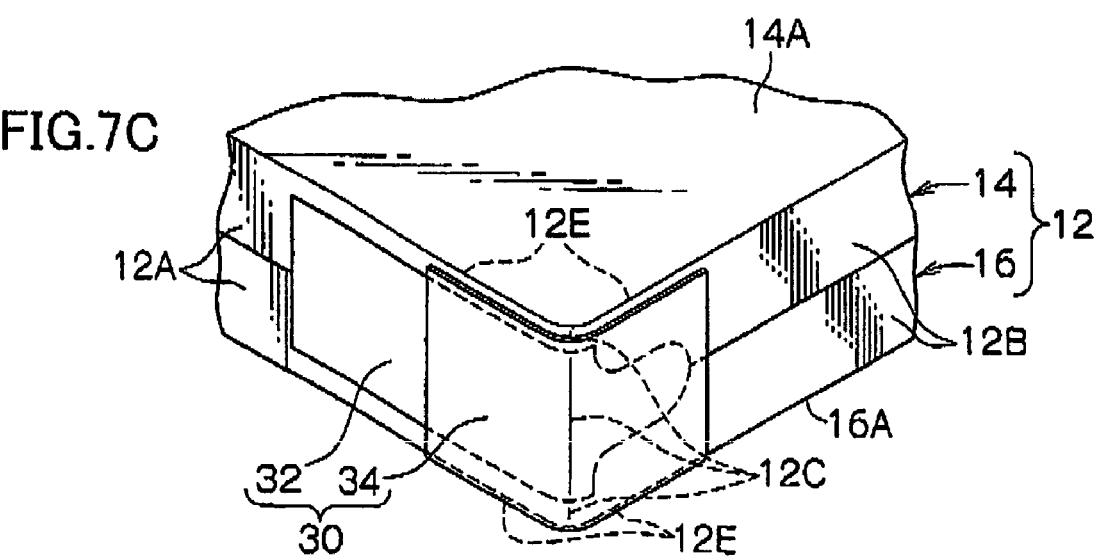

Further, as shown in FIG. 7B, the cover member 34 may be formed to a size such that it can cover only the corner portion 12C and the portion of the top surface 14A contiguous to the corner portion 12C. Or, as shown in FIG. 7C, the cover member 34 may be formed to a size such that it can cover only the corner portion 12C and the portion of the bottom surface 16A contiguous to the corner portion 12C. However, when the cover member 34 is structured so as to cover portions of both the top surface 14A and the bottom surface 16A so as to nip the case 12 from the top and bottom, not only can permanent deformation be prevented, but also, temporary flexural deformation can be suppressed. Therefore, such a structure is preferable.

Next, operation of the door 30 in the recording tape cartridge 10 having the above-described structure will be described. When the recording tape cartridge 10 is not in use, the door 30 closes the opening 20. Namely, the closing member 32 closes the opening 32, and the cover member 34 is fit together with the concave surface portions 40 and covers them.

In this way, when the cover member 34 presses, from above and below, the corner portion 12C at which the opening 20 is formed (i.e., when the cover member 34 nips the case 12 from the top surface 14A and the bottom surface 16A), even if impact is applied to a vicinity of the corner portion 12C due to a drop or the like, permanent deformation such as breakage or the like can be prevented. Further, temporary flexural deformation, such as the peripheral wall 14B of the upper case 14 and the peripheral wall 16B of the lower case 16 separating from one another, can be suppressed. Accordingly, problems such as the leader tape 22 dropping out from the engaging grooves 24 (the holding position) do not occur.

The clearance S3 between the abutting portion 38 and the engaging concave portion 42 is smaller than the clearance S1 between the cover member 34 and the concave surface portion 40, and the clearance S2 between the supporting shaft 26 and the through hole 36A. Therefore, the impact force applied due to a drop or the like is first received at the abutting portions 38 and the engaging concave portions 42. Accordingly, because it is possible for the impact force to not be directly transmitted to the supporting shaft 26 for example, it is possible to prevent breakage, deformation or the like of the supporting shaft 26. Moreover, because the screw boss 25 is disposed in a vicinity of the supporting shaft 26, the impact force at the time of a drop is received by the screw boss 25 as well. Accordingly, breakage or deformation of the supporting shaft 26 can be prevented even more.

Moreover, when the cover member 34 is covering the concave surface portions 40 (i.e., when the opening 20 is closed), the cover member 34 is 0.05 mm or more lower (i.e., concave) than the top surface 14A, the bottom surface 16A, and the left side surface 12B. Accordingly, when the recording tape cartridge 10 is loaded into a drive device, problems such as the cover member 34 catching on the loading opening do not occur.

Further, when the recording tape cartridge 10 is loaded into a drive device and the door 30 rotates (i.e., at times of opening and closing the opening 20), a slight gap is formed by the annular convex portions 37 between the closing member 32 and the case 12 (the upper case 14 and the lower case 16). Therefore, there is little sliding resistance of the door 30 (the closing member 32) with respect to the case 12. In addition, at the door 30 (the closing member 32), if at least the rotating/sliding portions 36 and the annular convex portions 37 are formed of an olefin resin such as POM or the like, the sliding resistance can be made to be even smaller, as compared with that of a case 12 (including the supporting shaft 26) which is formed of a resin such as PC or the like.

In any case, the door 30 has, separately from the closing member 32 which closes the opening 20, the cover member 34 which can cover the corner portion 12C including portions of the top surface 14A and the bottom surface 16A. Therefore, even if impact is applied to a vicinity of the corner portion 12C due to a drop or the like, permanent deformation and temporary flexural deformation do not occur. Namely, by providing the cover member 34, the recording tape cartridge 10 having excellent impact resistance can be provided. Note that it is possible to provide the cover member 34 not only at the corner portion 12C at which the opening 20 is provided, but also at other corner portions, such as, for example, the corner portion 12D or the like where the opening 20 is not provided.

Next, explanation will be given of another embodiment which prevents permanent deformation and flexural deformation without providing the cover member 34. Note that portions which are the same as those described above are denoted by the same reference numerals, and description thereof is omitted. As shown in FIG. 8, a thin-plate-shaped reinforcing member 50 is provided integrally at the upper case 14 and/or the lower case 16 in a vicinity of the opening 20.

Namely, a concave surface portion 48 of a predetermined depth which extends over portions of the front surface 12A and the left side surface 12B, is formed in a portion of the top surface 14A of the upper case 14 and/or the bottom surface 16A of the lower case 16 contiguous to the corner portion 12C. The reinforcing member 50 which is made of metal is joined to the concave surface portion 48. With such a structure, if impact is applied to a vicinity of the corner portion 12C due to a drop or the like, permanent deformation such as breakage or the like can be prevented.

The method of joining at this time may be any method of joining such as caulking, adhesion, fitting, insert molding, or the like. The metal reinforcing member 50 may be formed by pressing (including deep drawing) or die casting. The metal material is preferably a metal which is hard and difficult to rust, such as SUS or the like. Moreover, the reinforcing member 50 may be formed of metal and resin.

Figure 9:
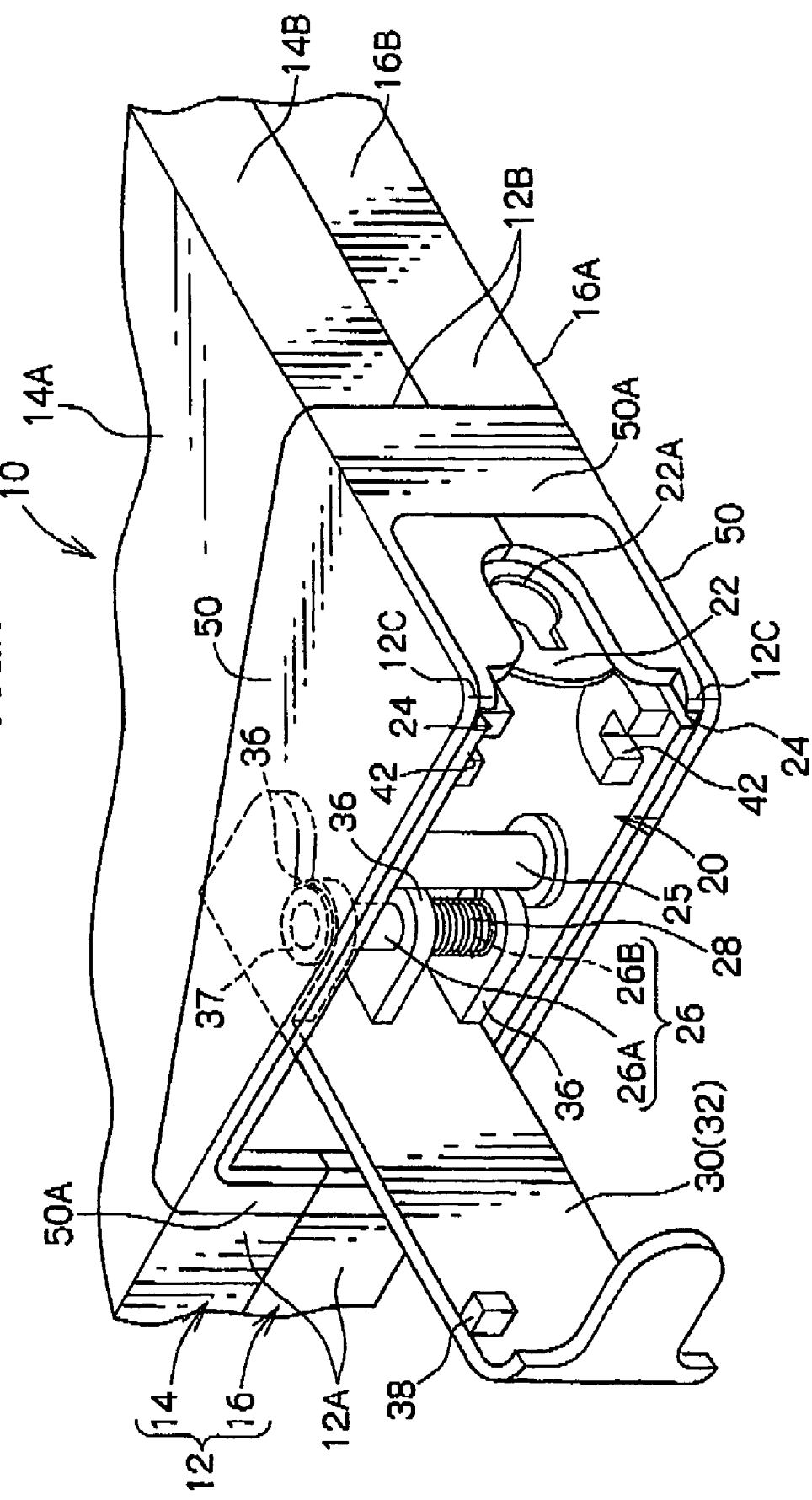
FIG. 9 is a schematic perspective view of the corner portion.

When the reinforcing members 50 are provided at the top surface 14A and the bottom surface 16A, as shown in FIG. 9, the top and bottom reinforcing members 50 may be connected integrally by connecting portions 50A at regions which do not obstruct the opening 20 and rotation of the door 30 (the closing member 32). When such a configuration is used, if impact is applied to the corner portion 12C due to a drop or the like, permanent deformation such as breakage or the like can be prevented, and flexural deformation, such as the peripheral walls 14B, 16B temporarily moving apart from one another, also can be suppressed.

It is possible to provide the connecting portion 50A at only the front surface 12A or at only the left side surface 12B. However, providing the reinforcing portion 50A at both the front surface 12A and the left side surface 12B is preferable as flexural deformation can be suppressed even more. In the same way as the above-described cover member 34, is preferable that the place where the reinforcing member 50 is provided is L=0.05 mm or more lower (i.e., concave) than the top surface 14A, the bottom surface 16A, and the left side surface 12B.

The reinforcing member 50 is not limited to being provided in a vicinity of the opening 20 (a vicinity of the corner portion 12C). It is preferable that the reinforcing member 50 is provided at portions of the top surface 14A and/or the bottom surface 16A contiguous to each corner portion, including the corner portion 12C. Further, it is possible to provide the reinforcing member 50 not only at the outer surface side of the case 12, but also at the inner surface side of the case 12.

Figure 10A:
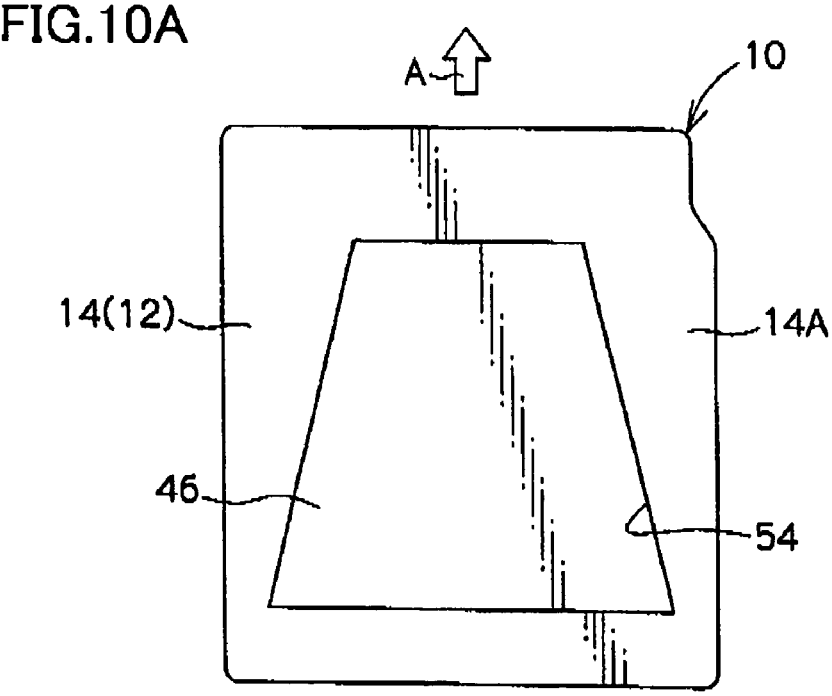
FIG. 10A is a schematic plan view of the recording tape cartridge.
Figure 10B:
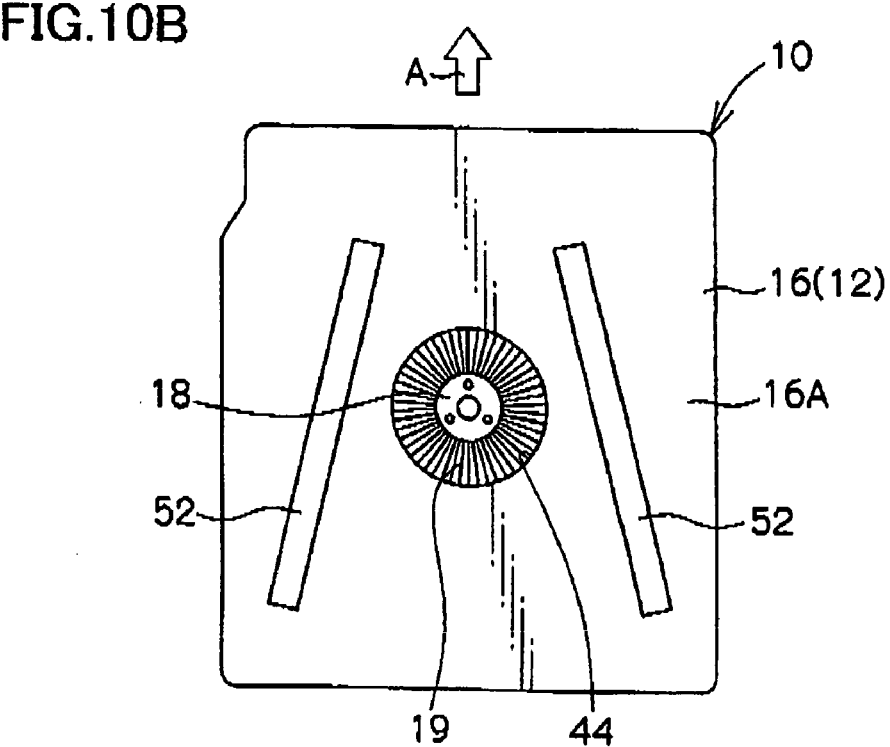
FIG. 10B is a schematic bottom view of the recording tape cartridge.

In addition, it is preferable to utilize a structure in which the recording tape cartridges 10 cannot be stacked with their front and rear sides reversed (cannot be stacked reversely). An example of a structure preventing reverse stacking is as follows: as shown in FIGS. 10A and 10B, a pair of long, thin stacking ribs 52, whose interval at the front side is narrow and whose interval at the rear side is wide, may be formed in the bottom surface 16A, and a stacking concave portion 54, with which the stacking ribs 52 fit together, may be formed in the top surface 14A. In this case, the stacking concave portion 54 may also serve as the label area 46. Or, the stacking concave portion 54 and the label area 46 may be provided separately.

Figure 11A:
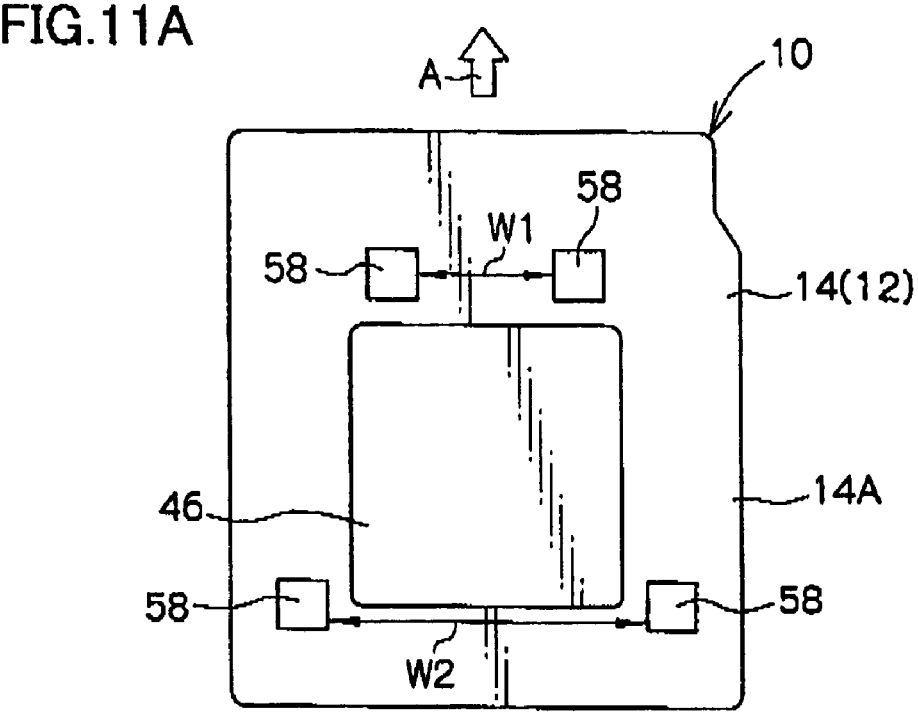
FIG. 11A is a schematic plan view of the recording tape cartridge.
Figure 11B:
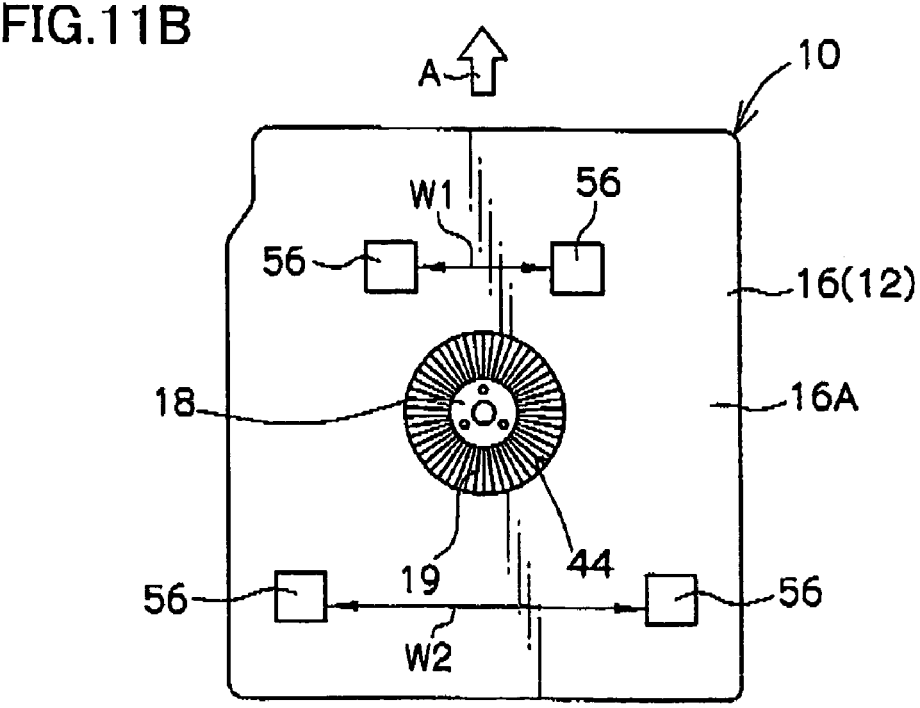
FIG. 11B is a schematic bottom view of the recording tape cartridge.

The following structure also can be considered as stacking ribs for not allowing reverse stacking. As shown in FIGS. 11A and 11B for example, a plurality (e.g., four) stacking ribs 56 of predetermined sizes may be formed in the bottom surface 16A, and the positions of the stacking ribs 56 at the front side and at the rear side can be made to be different positions. Namely, an interval W1 between the stacking ribs 56 at the front side is made to be narrow, whereas an interval W2 between the stacking ribs 56 at the rear side is made to be wide. The same number of stacking concave portions 58, which match the stacking ribs 56, are formed in the top surface 14A. Reverse stacking is prevented by such a structure as well. Note that, in this case, because the stacking concave portions 58 cannot also function as the label area 46, as illustrated, the label area 46 may be provided appropriately between the stacking concave portions 58 or the like. The numbers of the stacking ribs 56 and the stacking concave portions 58 may be three or less, but in consideration of stability, four or more is preferable.

Figure 12A:
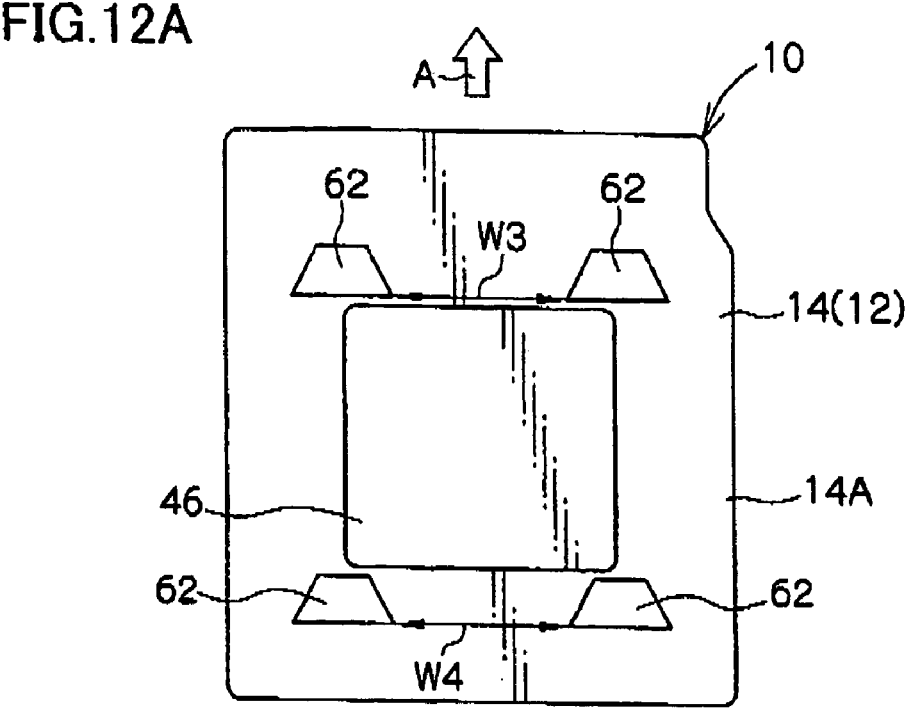
FIG. 12A is a schematic plan view of the recording tape cartridge.
Figure 12B:
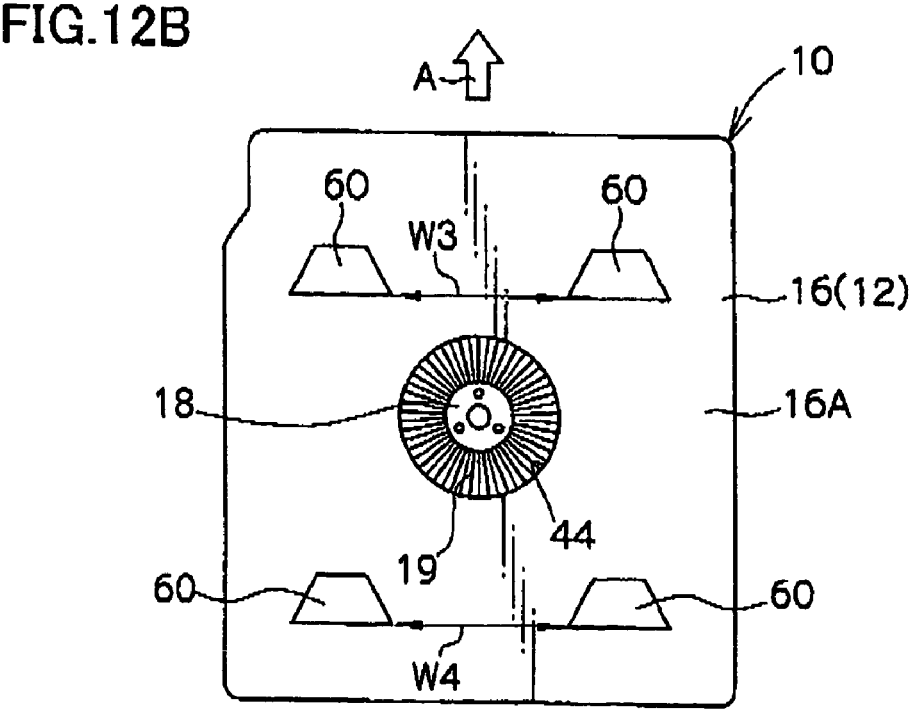
FIG. 12B is a schematic bottom view of the recording tape cartridge.

Further, as shown in FIGS. 12A and 12B for example, a plurality (e.g., four) stacking ribs 60 which are trapezoidal in plan view may be formed in the bottom surface 16A. In this case, there is no need to make the positions at the front side and at the rear side offset from one another. Namely, an interval W3 between the stacking ribs 60 at the front side and an interval W4 between the stacking ribs 60 at the rear side may be made to be the same. The same number of stacking concave portions 62, which match the stacking ribs 60, are formed in the top surface 14A. Reverse stacking is prevented by such a structure as well. Note that, in this case as well, because the stacking concave portions 62 cannot also function as the label area 46, as illustrated, the label area 46 may be provided appropriately between the stacking concave portions 62 or the like. The numbers of the stacking ribs 60 and the stacking concave portions 62 may be three or less, but in consideration of stability, four or more is preferable.

Figure 13A:
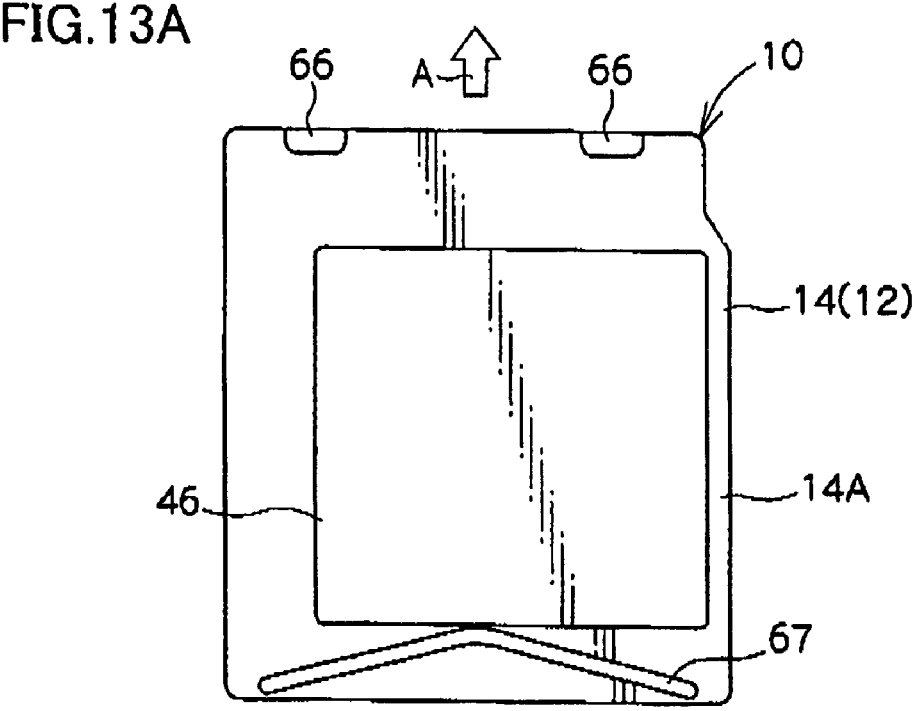
FIG. 13A is a schematic plan view of the recording tape cartridge.
Figure 13B:
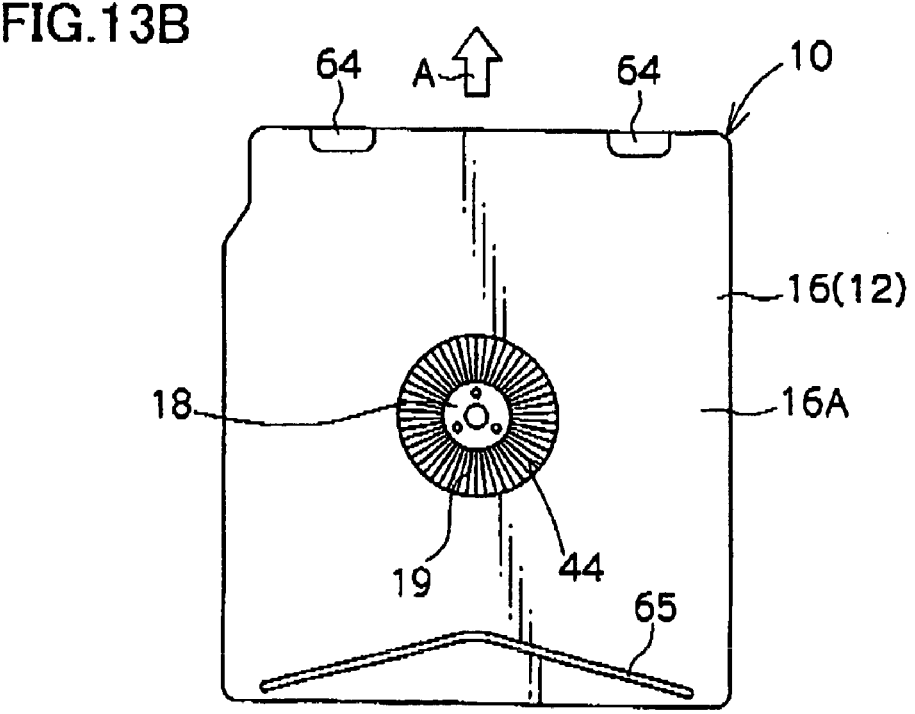
FIG. 13B is a schematic bottom view of the recording tape cartridge.

Moreover, as shown in FIGS. 13A and 13B for example, a pair of stacking ribs 64 may be provided so as to be set apart from one another by a predetermined interval in the front edge of the bottom surface 16A, and a substantially V-shaped or substantially U-shaped stacking rib 65 may be provided at the rear side of the bottom surface 16A. The end portions of this stacking rib 65 which is provided at the rear side are positioned in vicinities of the rear side corner portions, and the central, bent portion of the stacking rib 65 is positioned in a vicinity of the gear opening 44. Stacking concave portions 66, 67 matching the stacking ribs 64, 65 are formed in the top surface 14A. Reverse stacking is prevented by such a structure as well. Note that, in this case as well, because the stacking concave portions 66, 67 cannot also function as the label area 46, as illustrated, the label area 46 may be provided appropriately between the stacking concave portions 66 and the stacking concave portion 67 or the like.

Figure 14A:
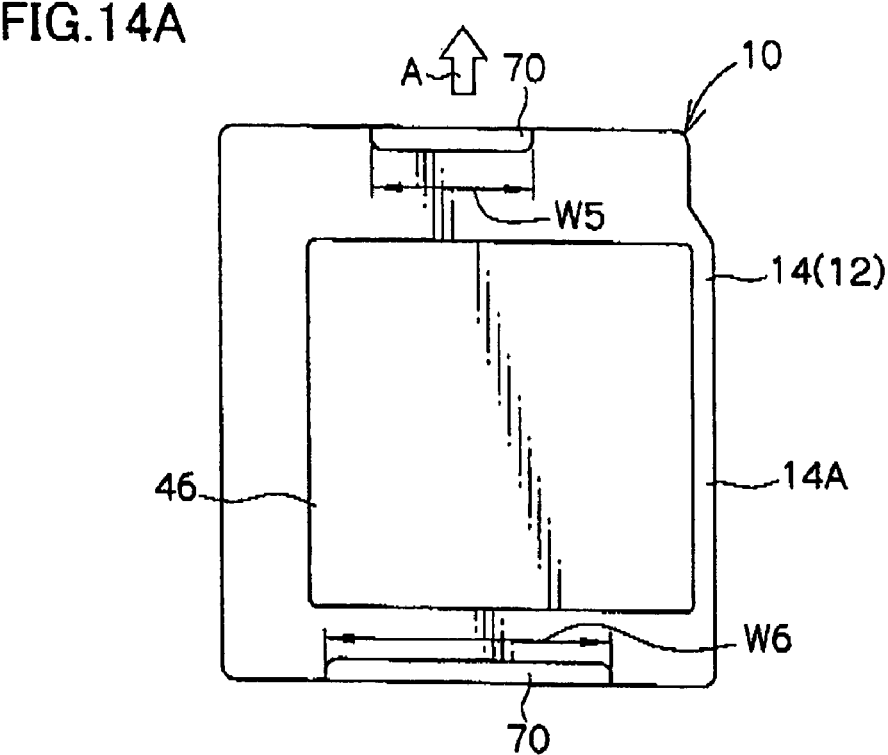
FIG. 14A is a schematic plan view of the recording tape cartridge.
Figure 14B:
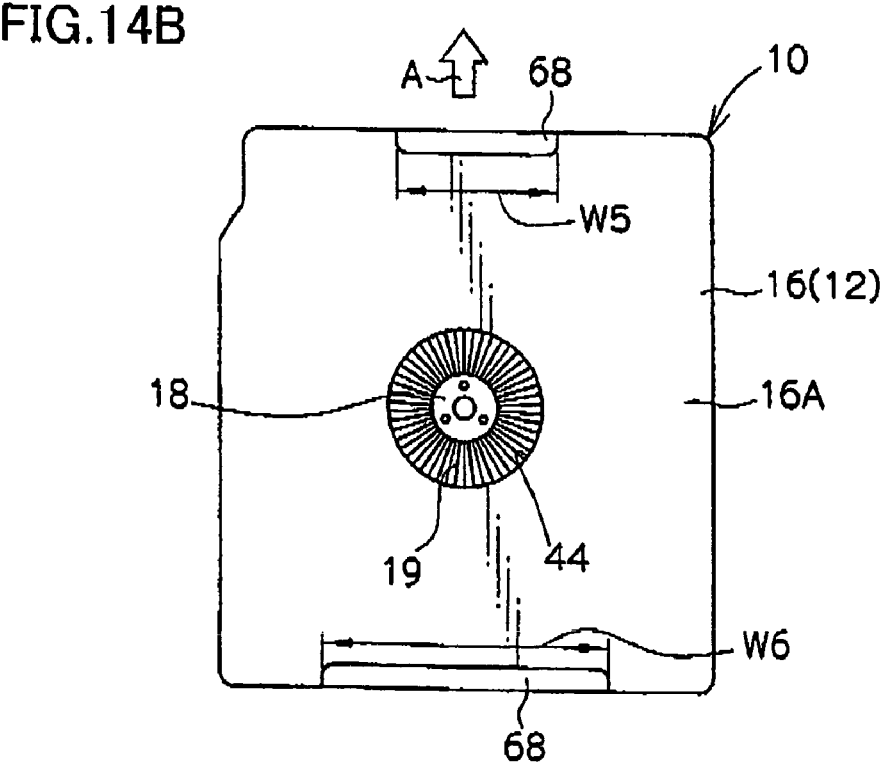
FIG. 14B is a schematic bottom view of the recording tape cartridge.

In addition, as shown in FIGS. 14A and 14B for example, long and thin stacking ribs 68 of different lengths may be provided in the front edge and the rear edge of the bottom surface 16A. A length W6 of the rear side stacking rib 68 is formed to be longer than a length W5 of the front side stacking rib 68, although an opposite structure may be used (i.e., the front side stacking rib 68 may be longer than the rear side stacking rib 68). Stacking concave portions 70 matching the stacking ribs 68 are formed in the top surface 14A. Reverse stacking is prevented by such a structure as well. Note that, in this case as well, because the stacking concave portions 70 cannot also function as the label area 46, as illustrated, the label area 46 may be provided appropriately between the stacking concave portions 70 or the like.

Figure 15A:
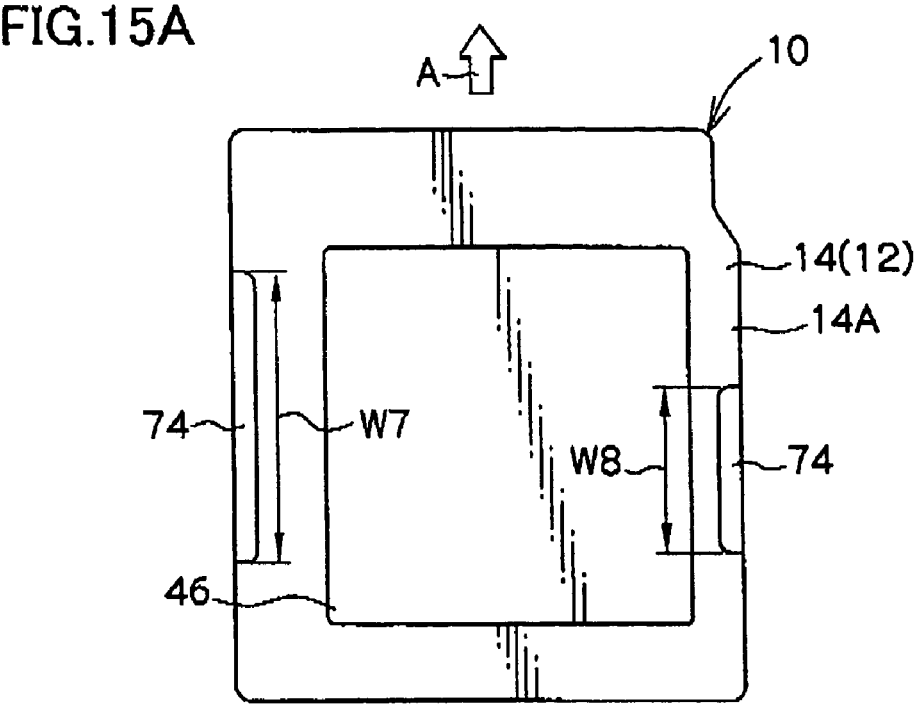
FIG. 15A is a schematic plan view of the recording tape cartridge.
Figure 15B:
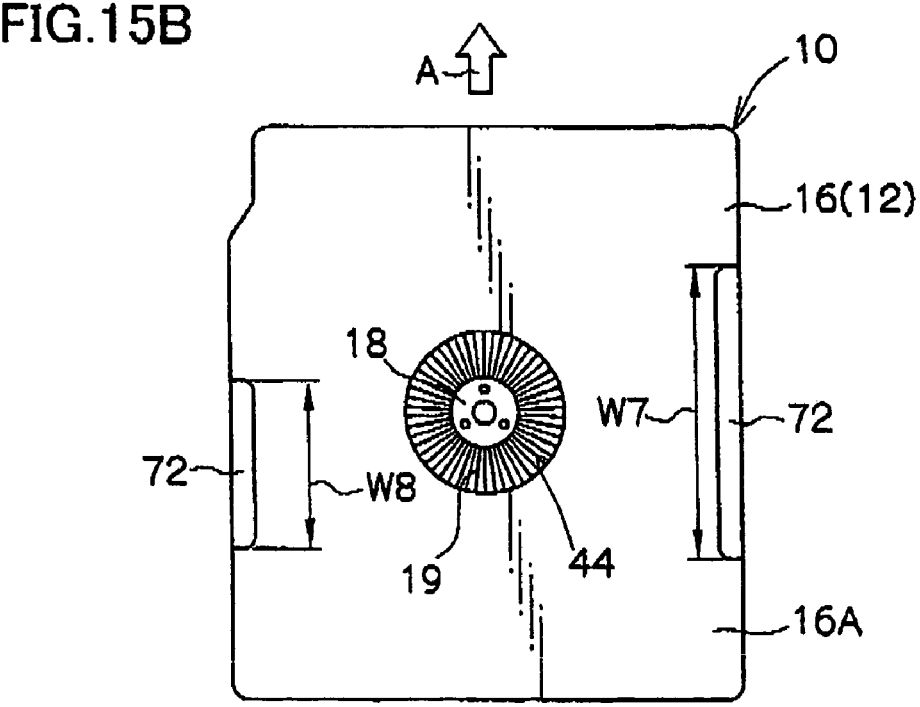
FIG. 15B is a schematic bottom view of the recording tape cartridge.
Figure 16A:
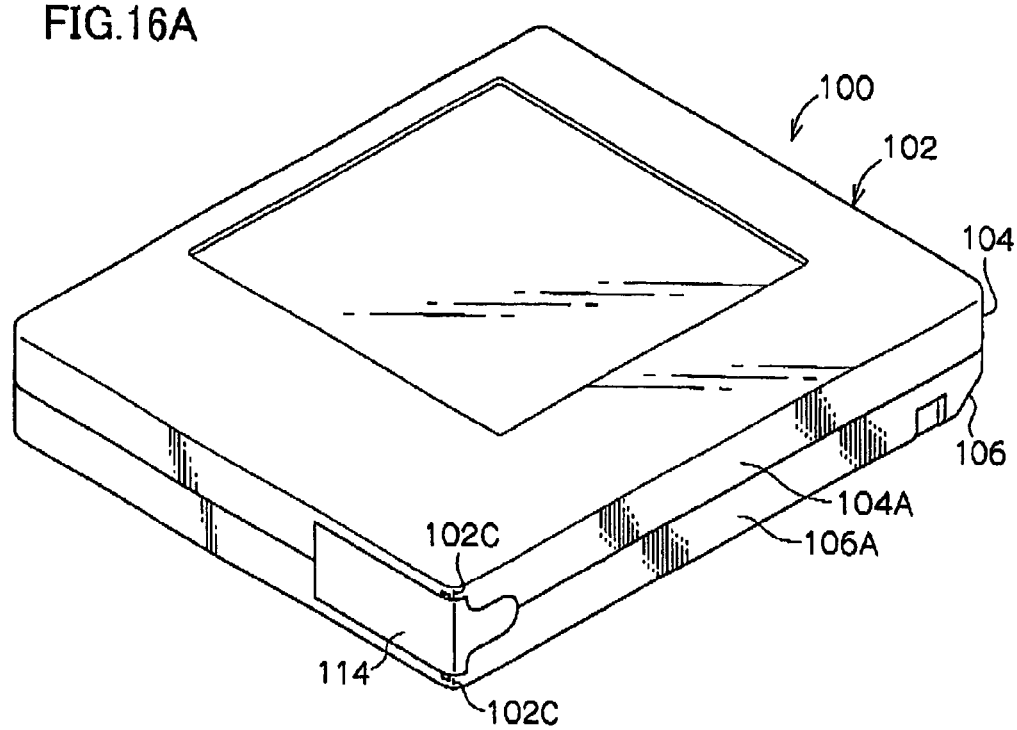
FIG. 16A is a schematic perspective view of a conventional recording tape cartridge.
Figure 16B:
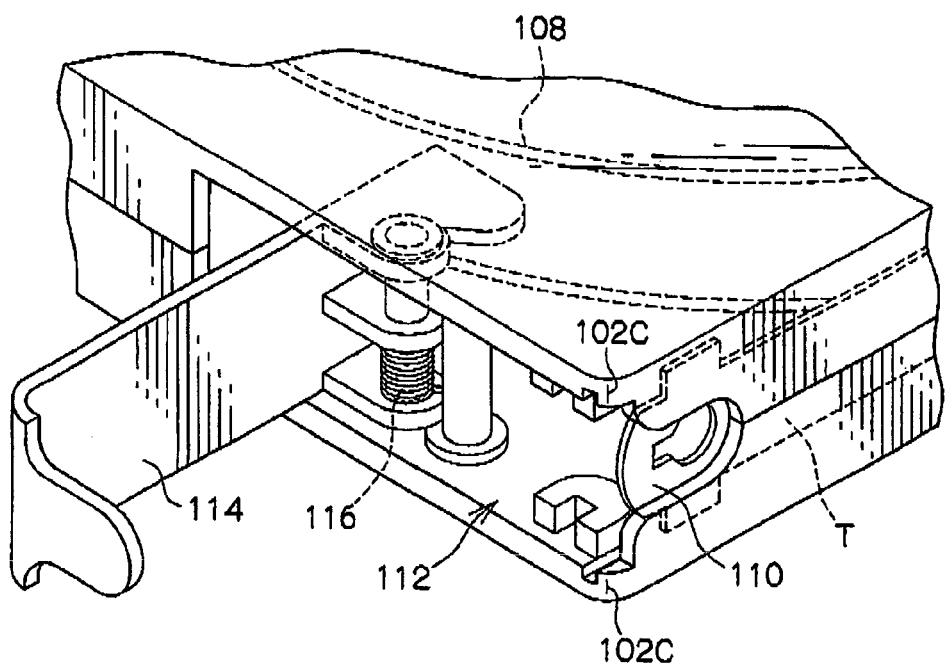
FIG. 16B is a schematic perspective view of a corner portion of the recording tape cartridge of FIG. 16A.

Still further, as shown in FIGS. 15A and 15B for example, long and thin stacking ribs 72 of different lengths may be provided in the left side edge and the right side edge of the bottom surface 16A. A length W8 of the stacking rib 72 at the right side edge is formed to be shorter than a length W7 of the left side edge stacking rib 72, although an opposite structure may be used (i.e., the stacking rib 72 at the left may be shorter than the stacking rib 72 at the right). Stacking concave portions 74 matching the stacking ribs 72 are formed in the top surface 14A. Reverse stacking is prevented by such a structure as well. Note that, in this case as well, because the stacking concave portions 74 cannot also function as the label area 46, as illustrated, the label area 46 may be provided appropriately between the stacking concave portions 74 or the like.

In any case, the stacking ribs 52, 56, 60, 64, 65, 68, 72 and the stacking concave portions 54, 58, 62, 66, 67, 70, 74 may be formed in any configuration provided that they are configurations which together do not allow reverse stacking.

What is claimed is:

1. A recording tape cartridge comprising:
    a case rotatably accommodating a single reel on which a recording tape is wound; and
    an opening formed in a vicinity of a corner portion of the case, the opening being for pulling-out of a leader member attached to an end portion of the recording tape, wherein a cover member, which covers the corner portion of the case including a portion of a top surface and/or a bottom surface of the case, is provided so as to be rotatable.

2. The recording tape cartridge of claim 1, wherein said vicinity of the corner portion means a portion of a front surface adjacent to or in a neighborhood of the corner portion, or portions of the front surface and a side surface adjacent to or in a neighborhood of the corner portion, or portions of the front surface, the side surface, and at least one of the top surface and the bottom surface adjacent to or in a neighborhood of the corner portion.

3. The recording tape cartridge of claim 1, wherein the cover member is formed of resin, or metal, or resin and metal.

4. A recording tape cartridge comprising:
a case rotatably accommodating a single reel on which a recording tape is wound;
an opening formed in a vicinity of a corner portion of the case, the opening being for pulling-out of a leader member attached to an end portion of the recording tape; and
a door opening and closing the opening,
wherein the door is structured so as to be able to cover the corner portion of the case including a portion of a top surface and/or a bottom surface of the case, when the door closes the opening.

5. The recording tape cartridge of claim 4, wherein said vicinity of the corner portion means a portion of a front surface adjacent to or in a neighborhood of the corner portion, or portions of the front surface and a side surface adjacent to or in a neighborhood of the corner portion, or portions of the front surface, the side surface, and at least one of the top surface and the bottom surface adjacent to or in a neighborhood of the corner portion.

6. The recording tape cartridge of claim 4, wherein the door is formed of resin, or metal, or resin and metal.

7. The recording tape cartridge of claim 4, wherein the door is structured so as to be able to open and close the opening by rotating.

8. A recording tape cartridge comprising:
a case rotatably accommodating a single reel on which a recording tape is wound;
an opening formed in portions of a front surface and a side surface adjacent to a corner portion of the case, the opening being for pulling-out of a leader member attached to an end portion of the recording tape; and
a door opening and closing the opening by rotating,
wherein the door is structured so as to be able to cover the corner portion of the case including a portion of a top surface and/or a bottom surface of the case, when the door closes the opening.

9. The recording tape cartridge of claim 8, wherein the door is structured so as to cover surfaces including edges of the top surface and the bottom surface of the case which edges are contiguous to the front surface and the side surface.

10. The recording tape cartridge of claim 8, wherein the door is formed of resin, or metal, or resin and metal.

11. The recording tape cartridge of claim 8, wherein the door is formed of metal and shaped by one of pressing and die casting.

12. The recording tape cartridge of claim 8, wherein the door is formed of metal, and a plate thickness of the door is 0.3 mm to 0.5 mm.

13. The recording tape cartridge of claim 8, wherein the door is formed of resin and metal, and a resin portion of the door and a metal portion of the door are integrally joined by one of adhesion, caulking, fitting, insert molding, and outsert molding.

14. The recording tape cartridge of claim 8, wherein the door is structured so as to open and close the opening by rotating around a supporting shaft provided at the case.

15. The recording tape cartridge of claim 8, wherein the door is structured so as to open and close the opening by rotating around a supporting shaft provided at the case, and at least a rotating/sliding portion, through which the supporting shaft is inserted, is formed of resin.

16. The recording tape cartridge of claim 8, wherein the door is structured so as to be recessed by 0.05 mm or more than the top surface, the bottom surface, and the side surface of the case, when the door closes the opening.

17. The recording tape cartridge of claim 8, wherein an abutting portion, which abuts an engaging portion of the case, is provided at an inner side of the door.

18. The recording tape cartridge of claim 8, wherein an abutting portion, which abuts an engaging portion of the case, is provided at an inner side of the door, and the door is structured so as to open and close the opening by rotating around a supporting shaft provided at the case, and a clearance between the engaging portion and the abutting portion is smaller than a clearance between the supporting shaft and a rotating/sliding portion through which the supporting shaft is inserted and a clearance between an inner surface of the door and the top surface, the bottom surface and the side surface of the case.

19. The recording tape cartridge of claim 8, wherein the door is structured by a closing member of a same size as the opening, and a cover member which covers portions of the front surface, the side surface, and the top surface and/or the bottom surface of the case.

20. The recording tape cartridge of claim 8, wherein the door is structured by a closing member of a same size as the opening, and a cover member which covers portions of the front surface, the side surface, and the top surface and/or the bottom surface of the case, and at least the closing member is formed of resin.

* * * * *